J. B. WELLS.
AUTOMATIC DUMP BODY FOR VEHICLES.
APPLICATION FILED DEC. 28, 1917.
1,301,023.
Patented Apr. 15, 1919.
3 SHEETS—SHEET 3.
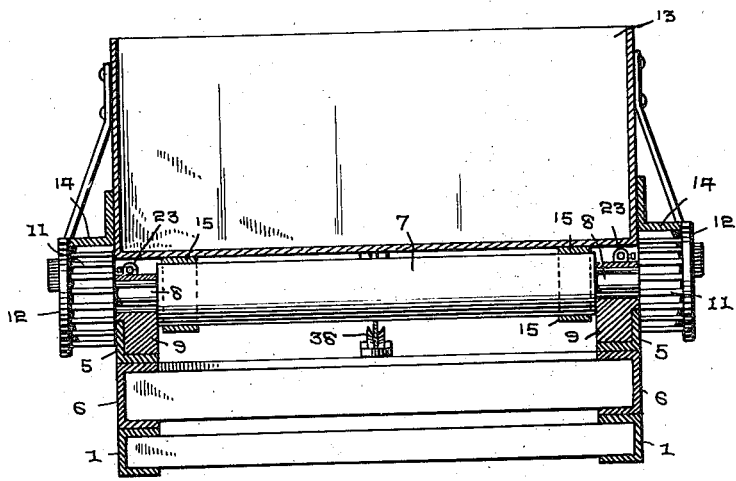
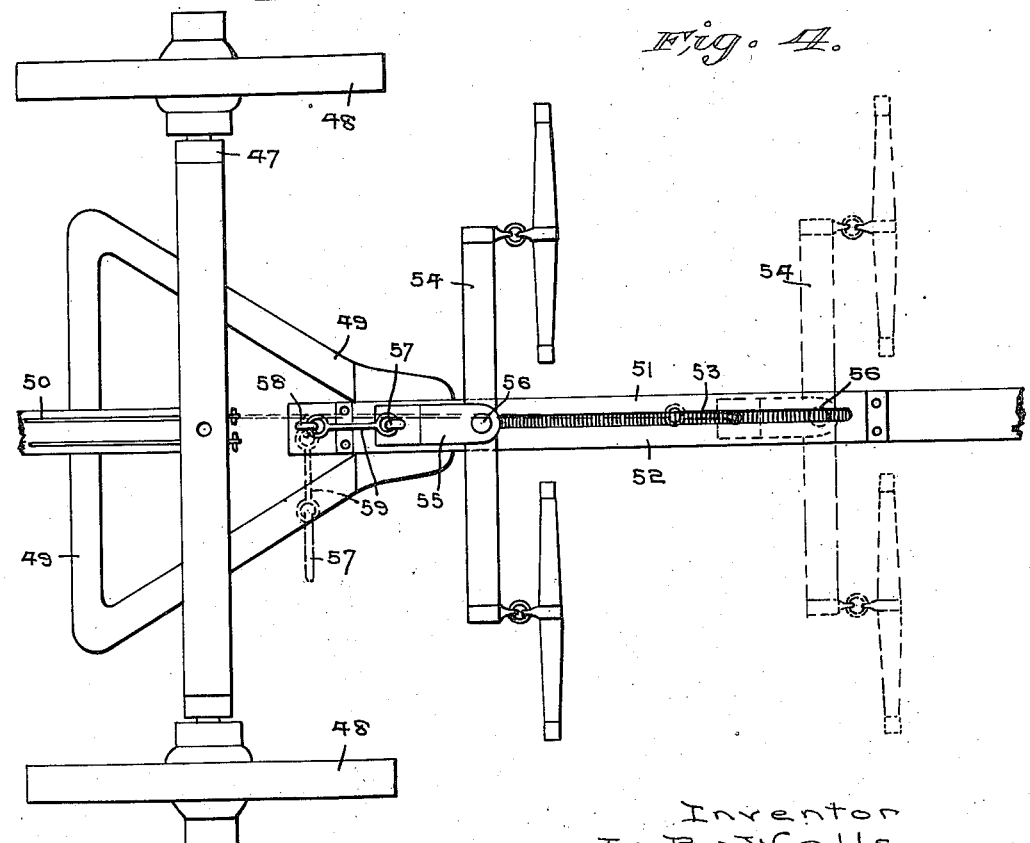
Inventor
J. B. Wells
FitzGerald & Co
Attorneys

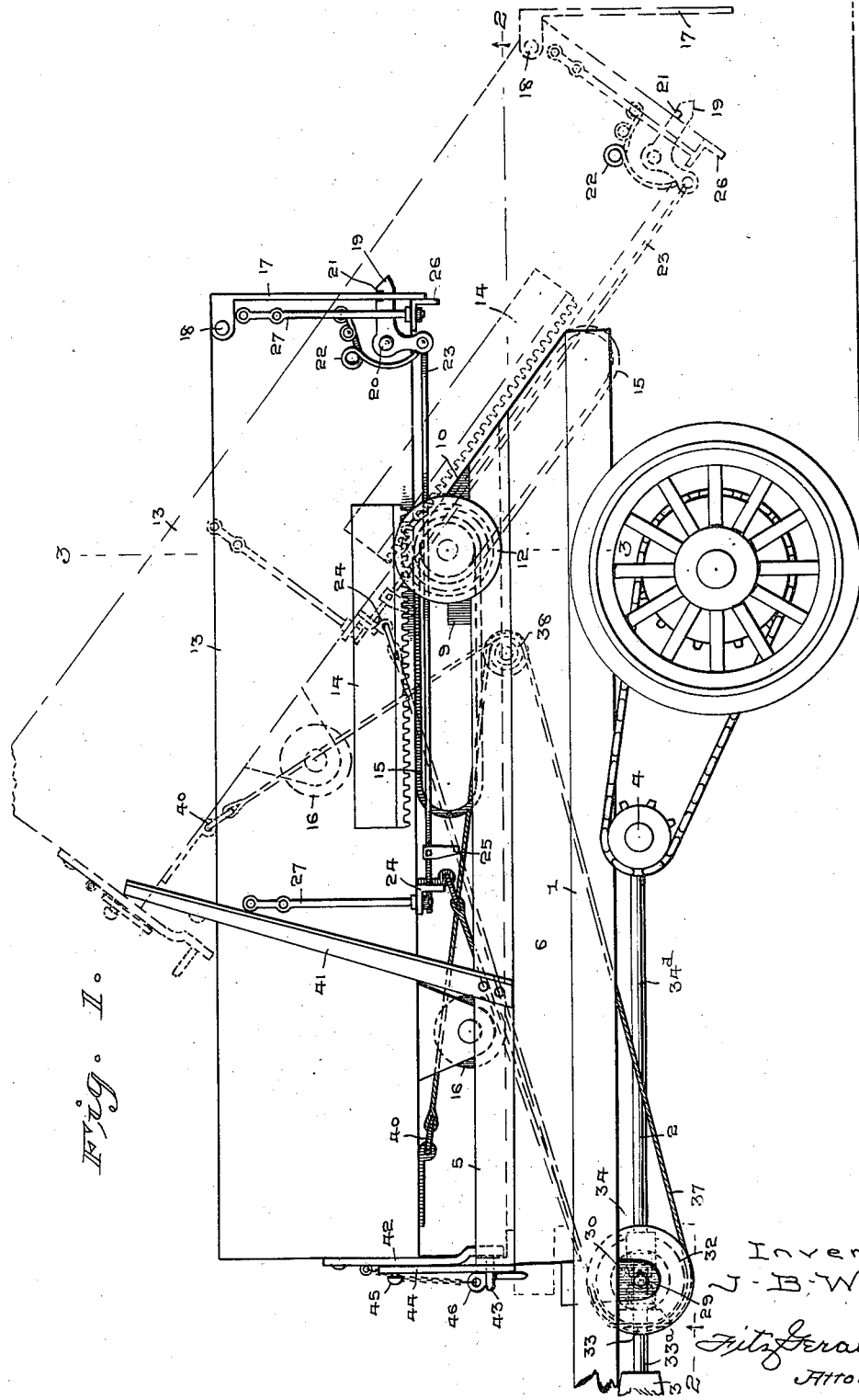

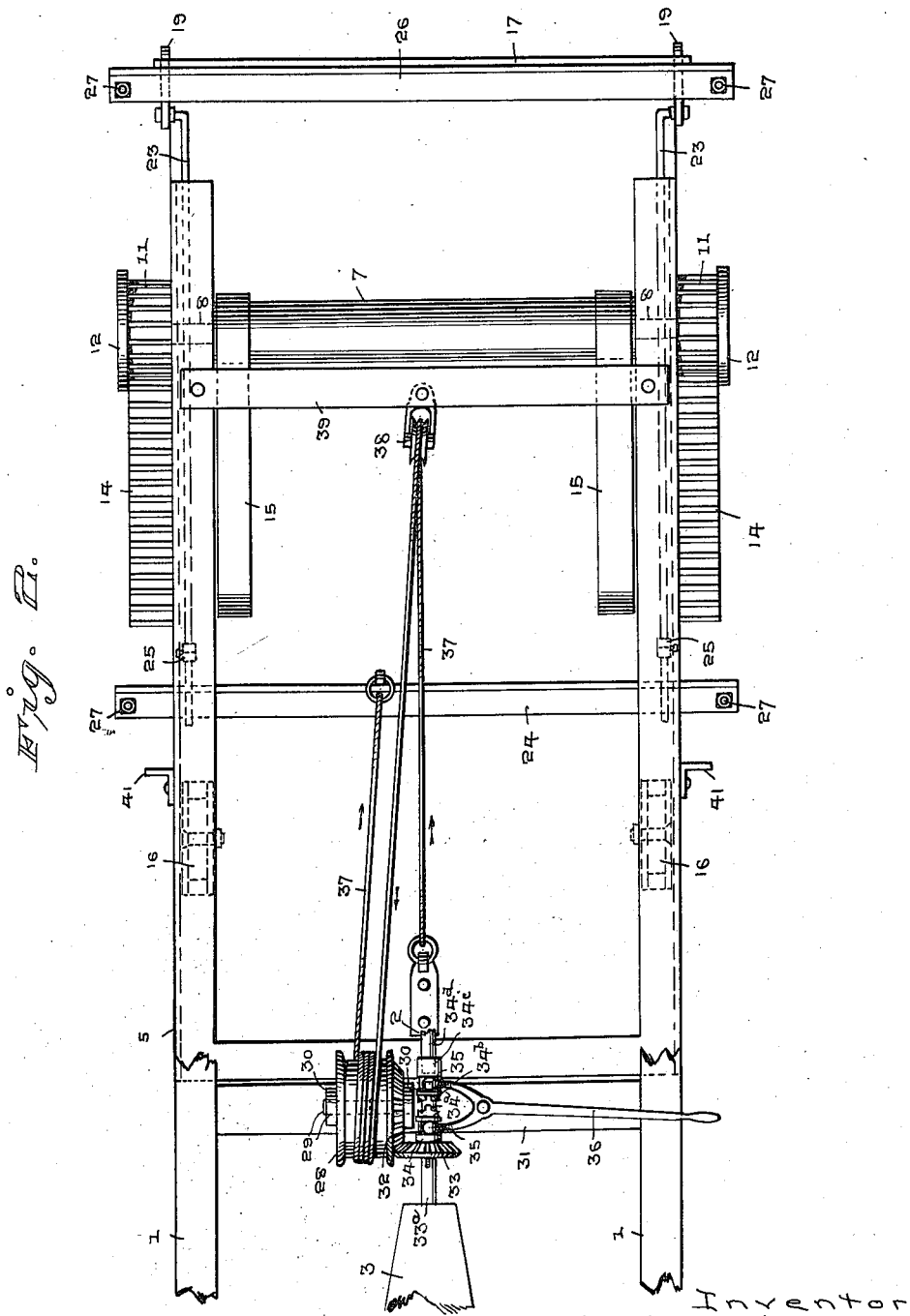

UNITED STATES PATENT OFFICE.

JAMES B. WELLS, OF TACOMA, WASHINGTON.

AUTOMATIC DUMP-BODY FOR VEHICLES.

1,301,023.

Specification of Letters Patent. Patented Apr. 15, 1919.

Application filed December 28, 1917. Serial No. 209,292.

*To all whom it may concern:*

Be it known that I, JAMES B. WELLS, a citizen of the United States, residing at Tacoma, in the county of Pierce and State of Washington, have invented certain new and useful Improvements in Automatic Dump-Bodies for Vehicles; and I do hereby declare the following to be a full, clear, and exact description of the invention, such as will enable others skilled in the art to which it appertains to make and use the same.

This invention relates to an automatic dump body for vehicles and the main object of the invention is to provide manually controlled means for shifting the body into and out of a position for automatic dumping, said manually controlled means being also utilized to return and restore the vehicle body to its normal position.

Another object of the invention is to provide a dump body with a pivoted end gate and latches for holding it in closed position, means being provided for automatically releasing said latches when the body is moved into a position for automatic dumping.

A further object of the invention is to provide means for guiding the movement of the body in longitudinal alinement with the main supporting frame and vehicle chassis, means being also provided to prevent lateral movement of the body while it is being shifted into and out of a dumping position.

A still further object of the invention is to utilize the body shifting means for controlling the dumping movement of the body.

A still further object of the invention is to provide means for securing the forward end of the dump body to the main supporting frame when in normal position to prevent casual movement of the body.

With these and other objects in view as will appear as the description proceeds, the invention comprises the various novel features of construction, combination and arrangement of parts as will be fully described hereinafter and afterward specifically claimed.

Referring to the drawings:

Figure 1 represents a side elevation of the automatic dump body operatively associated with a vehicle chassis, Fig. 2 represents a sectional bottom plan view taken on a plane indicated by the line 2—2 on Fig. 1, Fig. 3 represents a vertical transverse sectional view taken on a plane indicated by the line 3—3 on Fig. 1, and Fig. 4 represents a plan view of horse power means for actuating the dump body when associated with the wagon running gear.

Similar characters of references are used to denote corresponding parts throughout the accompanying drawings and the following description.

In order that the construction and operation of the invention may be readily comprehended by those skilled in the art to which the invention relates, I have illustrated a preferred form of the invention in the accompanying drawings, and will now proceed to fully describe the same in connection with said drawings, in which 1 indicates a frame of a vehicle chassis, in this instance a self-propelled vehicle, 2 a drive shaft formed in two sections operatively connected between the transmission 3 and the jack shaft 4.

A main body frame 5 is positioned on a supporting frame 6 carried by the vehicle frame 1. Each of the frames 5 and 6 is substantially rectangular, the former being constructed in this instance of angle iron while the latter is constructed of channel iron. It is of course to be understood that the main frame 5 can be supported on the chassis in any desirable manner, such as by using cross sills or the like.

7 indicates a roller shaft provided with trunnions 8 journaled in suitable bearings 9 mounted on the main frame 5 and adjacent the rear end thereof. The rear end of each bearing 9 is beveled as indicated at 10 and is adapted to support the dump body when arranged in dumping position, as clearly shown in Fig. 1. A pinion 11 is fixed on the end of each trunnion 8 and is provided on its outer face with a flange 12.

The dump body is indicated by the numeral 13 and is provided on opposite sides with rack bars 14, disposed in planes parallel to the bottom of the body and adapted to mesh with the pinions 11. 15 indicates elongated stop loops secured to the under surface of the body and receiving the ends of the roller shaft. These loops provide means for slidably and pivotally connecting the body to the shaft roller and limit the sliding or shifting movement of the body in opposite directions.

While the roller shaft 7 serves to support the rear end of the body, supporting rollers 16 are attached to the forward opposite sides of the body and rest within the angle iron main frame 5 which latter serves as a guide for the rollers while the body is being shifted from one position to another.

An end gate 17 has its upper end pivotally connected to the body as at 18. The lower opposite sides of the end gate are provided with slots through each of which is adapted to project one end 19 of a right angular latch member pivoted as at 20 on the side of the body. The end 19 is provided with a notch 21 adapted to engage the end of the slot in the end gate to hold it in closed position. 22 indicates a tension spring which bears against the latch member to hold it in latched position. A trip rod 23 has one end attached to the latch member and is extended longitudinally beneath the body and has its opposite end slidably mounted through an angle cross bar 24. 25 indicates a trip member adjustably mounted on the trip rod 23 and the trip is adapted to engage the forward end of the bearing 9 when the body is shifted to a position for automatic dumping, to release the latch member and permit the end gate to automatically swing open at the instant the body begins to dump. 26 indicates an angle bar arranged transversely beneath the rear end of the body and is rigidly attached to the body by suitable braces 27. The cross bar 24 is also rigidly attached to the body by suitable braces 27.

In this instance the body is adapted to be shifted upon the main supporting frame by power driven mechanism operated from the vehicle driving shaft and comprises a winch embodying a drum 28 rotatably mounted on a shaft 29 journaled in suitable bearings 30 carried by a cross bar 31 of the chassis frame 1. 32 indicates a beveled gear fixed to the drum 28 and engages a similar gear 33 provided with a grooved sleeve 34 slidably feathered on the front shaft section 33ª. The rear end of this shaft section carries a fixed clutch 34ª adapted to be lockingly engaged by coöperating teeth 34ᵇ of a coacting sleeve 34ᶜ slidably feathered on the adjacent end of the other section 34ᵈ of the drive shaft 2. A forked lever 36 pivotally mounted intermediate its ends has its forked ends pivotally connected to the sleeves 34 and 34ᶜ as at 35. The adjacent ends of the drive shaft sections may, if desirable, be mounted in suitable bearings.

By this construction it will be apparent that the lever 36 can be actuated to simultaneously throw the gear 33 into engagement with the gear 32 and disengage the sliding sleeve 34ᶜ from the fixed clutch head 34ª on shaft section 33ª, thus throwing the cable drum mechanism into gear with the transmission drive shaft and at the same time disconnecting the rear section of the drive shaft to render the vehicle immovable.

Then by manually shifting the gears in the transmission in the usual manner, either into forward or reverse speed, the cable drum can be caused to revolve in opposite directions to shift the body into and out of dumping position.

After the body has been dumped and returned to normal position, the lever 36 can be again operated to throw the winch out of gear and the rear shaft section 34ᵈ into gear with the transmission drive shaft to enable the machine to be propelled in the usual manner.

37 indicates a cable, the intermediate portion of which is coiled around the drum 28. One end of the cable is extended from the drum 28 and attached to the cross bar 24, while the other end is extended rearwardly of the chassis, up and over a pulley 38 supported by a cross bar 39, and is attached to the under surface of the body at the forward portion thereof as indicated by the numeral 40.

While the rack bars 14 and the pinions 11 serve to guide the movement of the body in longitudinal alinement with the chassis and body supporting frame, I provide guide standards 41 which are attached to the frame 5 and extend upwardly a suitable distance. These guide standards serve to prevent lateral movement of the forward end of the body during its dumping action.

A depending arm 42 is attached to the forward end of the body and is provided at its lower end with an eye member 43 which is adapted to be projected through the slot in the forward end of the main frame 5. 44 indicates a plate pivoted at its upper end to the arm 42 as indicated at 45, and the lower end is provided with a slot adapted to receive the eye member 43. A locking pin 46 is flexibly connected to the arm 42 and is adapted to be inserted through the eye 43 to secure the arm 42 and plate 44 in locked engagement with the frame 5. This securing means just described will effectively hold the body in its normal horizontal position against any casual movement during the travel of the vehicle.

In the operation of the invention and when it is desired to dump the contents of the body, the lever 36 is actuated to throw the transmission drive shaft into gear with the winch, whereupon the cable 37 will be drawn in the direction indicated by the arrows in Fig. 2 and thereby shift the body from its normal position to a position at the rear of the frame 5 to automatically dump. The loops 15 will limit the rearward shifting movement of the body and when the body has reached the limit of rearward movement, the lever 36 is released or thrown into neutral position to permit the end of the cable to lengthen out to compensate for the distance between the arcs of movement of the end of the cable, attached at 40, with respect to the pulley 38 and the dumping pivot of the body. It is also to be noted that the rear ends 10 of the bearing 9 serve as a stop in connection with the rear beveled end of the main frame 5, for the body when in dumping or discharge position.

At the instant that the body has reached the limit of its rear horizontal movement, the forward ends of the trips 25 engage the forward ends of the bearings 9 and thus release the latches holding closed the end gate of the body so that the gate may swing outwardly as the body begins to dump and thereby facilitate a free and easy discharge of the body contents.

When it is desired to shift the body back into its normal position, the engine clutch is thrown out and the transmission gears shifted into reverse, after which the lever 36 is actuated to bring gear 33 into mesh with gear 32. The engine clutch is then let in to cause the shaft 33ᵃ to revolve in the reverse direction which will cause the drum 28 to rotate and wind the cable 37 so that it will, by virtue of its connection with the bar 24, swing the body downwardly on the pivotal roller shaft 7 and subsequently draw the body forward into its normal position whereupon the front end thereof may be rigidly attached to the frame 5 as hereinbefore described.

It is to be understood that, if desirable, the roller 7 need not be mounted in bearings as shown, but can be arranged between the body and frame 5 at a point intermediate the ends of the body for free rolling movement when the body is shifted into dumping position, suitable stop means being provided at the end of the frame to arrest the rearward rolling movement of the roller.

While I have described the invention as being preferably operated from the power driven shaft of the motor vehicle, I desire to have it understood that should it be desired to use the invention in connection with vehicles drawn by horses or other draft animals, I propose to use a vehicle front running gear section as illustrated in Fig. 4 of the drawings. This section of running gear comprises an axle 47, wheel 48, hounds 49 and a coupling pole 50, all of which are of standard and well known construction. In connection with these standard parts I employ a tongue 51 securely attached to the hounds 49 and which is provided on its upper side with the casing 52 provided with a central longitudinal slot 53.

54 indicates the equalizing bar of a double-tree and is pivotally connected within a clevis 55 by a pin 56 which extends down through the slot 53 and is provided with an enlarged head which is adapted to slidably bear against the under side of the casing 52 and serves to slidably connect the clevis and double-tree to the casing.

The rear end of the clevis 55 is provided with an aperture adapted to normally lie in alinement with an aperture formed in the rear end of the casing 52, and a coupling pin 57 is normally positioned through these apertures to maintain the clevis and double-tree in its normal position, said pin being connected to an eye 58 on the rear end of the tongue by a flexible connection 59.

When the invention is used in connection with the vehicle running gear of the character just described, the opposite ends of the cable 37 are provided with hooks which are adapted to be alternately engaged through the aperture in the rear end of the clevis 55 and with a hook secured to the cross bar 24 of the body.

In the operation of this form of device, and when it is desired to dump the contents of the vehicle body, the coupling pin 57 is removed and one end of the cable 37 attached to the clevis 55 while the other end is attached to the body. The draft animals are then driven forward until the double-tree has been moved to the dotted line position shown in Fig. 4 which is sufficient to shift the body rearwardly on the chassis to a position for automatic dumping. In order to return the body to its normal position, the draft animals together with the double-tree are moved forward to their normal position, the ends of the cable reversed end for end and the animals then driven forward which will cause the winch to operate in the reverse direction and return the body to its normal position in a ready and effective manner. After the body has been arranged in its normal position, the coupling pin 57 may be again replaced and the vehicle can be used in the usual manner.

Having thus described my invention, what I claim as new, is:

In combination with a vehicle chassis, a main frame mounted on the chassis, a roller shaft having trunnions journaled on the main frame and projecting beyond the sides thereof, said roller shaft being of length equal to the distance between said main frame, a dump body, elongated loops carried by the bottom of the body and depending within said main frame adjacent its opposite sides, said loops receiving and arranged to have their upper stretches continuously bear on said roller shaft, rack bars fixed to the opposite sides of the body, flanged pinions fixed on the outer ends of said roller shaft trunnions and meshing with said rack bars, the flanges of said pinions bearing against the sides of said rack bar to maintain said pinions in proper position, and mechanism for moving the body back and forth.

In testimony whereof I have signed my name to this specification in the presence of two subscribing witnesses.

JAMES B. WELLS.

Witnesses:
HIRAM F. GARRETSON,
W. F. HALLOWELL.